Figure 1:
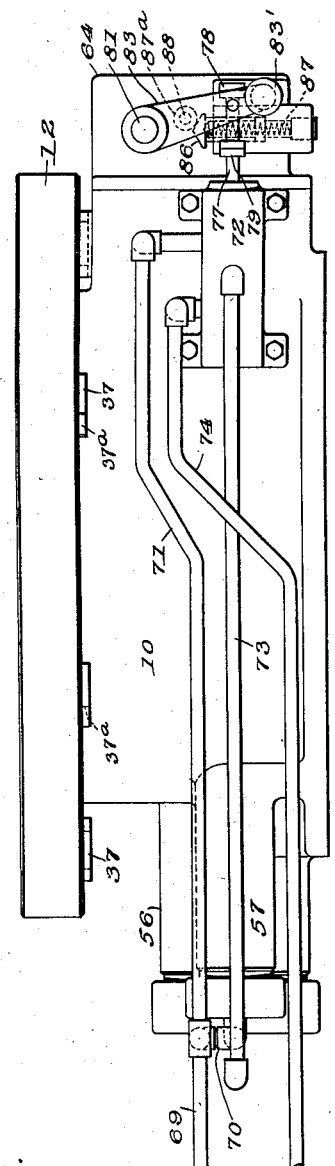

Feb. 4, 1930.  A. G. SUDHOFF  1,745,460
ROTARY TABLE HYDRAULICALLY OPERATED
Filed June 16, 1927  4 Sheets-Sheet 1

Inventor
Alfred G. Sudhoff
By Attorney
Nathan & Bowman

Feb. 4, 1930.  A. G. SUDHOFF  1,745,460
ROTARY TABLE HYDRAULICALLY OPERATED
Filed June 16, 1927  4 Sheets-Sheet 2

Inventor
Alfred G. Sudhoff.
By Attorney
Nathan & Bowman

Feb. 4, 1930.  A. G. SUDHOFF  1,745,460
ROTARY TABLE HYDRAULICALLY OPERATED
Filed June 16, 1927    4 Sheets-Sheet 3

Inventor
Alfred G. Sudhoff
By Attorney
Nathan + Bowman

Feb. 4, 1930.　　　A. G. SUDHOFF　　　1,745,460
ROTARY TABLE HYDRAULICALLY OPERATED
Filed June 16, 1927　　　4 Sheets-Sheet 4

Inventor
Alfred G. Sudhoff
By Attorney
Nathan & Bowman

Patented Feb. 4, 1930

1,745,460

UNITED STATES PATENT OFFICE

ALFRED G. SUDHOFF, OF RICHMOND, INDIANA, ASSIGNOR TO NATIONAL AUTOMATIC TOOL COMPANY, OF RICHMOND, INDIANA, A CORPORATION OF INDIANA

ROTARY TABLE HYDRAULICALLY OPERATED

Application filed June 16, 1927. Serial No. 199,228.

This invention is directed to improvements in hydraulic power means for operating index tables and the various controls and stop mechanism for accurately locating the table in its indexed positions. The chief features of such means includes a rotary head or table adapted to carry either working tools or the work to be operated upon, such head being located on a machine and opposite to the opposed head containing the working tool or the part to be operated upon as the case may be. The organization includes power means whereby the head may be progressively rotated through a step-by-step movement to successively bring the working tools into proper relation with respect to the part to be machined. Control devices are provided in each case which may be either automatic or manual or a combination of the two.

Various power means have been developed for rotating the head one of the early forms being the use of springs for the operation of a rack which in turn was caused to act upon the spindle of the rotary head. Such devices had various inherent defects, such as the frequent breakage of the springs and the variation of the force exerted throughout the extent of compression of the spring, which resulted in their replacement in many cases by fluid pressure operating pistons in accordance with the quite general application of fluid means to the operation of various machine elements.

One of the necessary elements in an indexing head is the provision of adequate means for stopping the head after partial rotation in the desired position and thereafter rigidly locking the head in such position whereby the force resulting from the application of the tools to the working part will not result in the dislocation thereof. Accurate positioning of the head and its maintenance in such position is of prime importance and accordingly various and many devices have been resorted to in connection with the fluid operating means for arriving at such a result and such striving for reliable means has resulted in most cases in a plurality of devices whereby one element serves to stop the head in a certain position and others are then brought into operation to lock it.

One of the important objects of this invention consists of the provision of a very much simplified construction and one capable of extreme accuracy. The means disclosed herein for accomplishing such novel results comprise broadly a fluid pressure piston operating upon the rotary index spindle until such rotary spindle or head is brought into engagement with a fixed stop. The pressure is not then relieved on the piston but is continued and serves as a means for holding the head against said stop in the original position at which the rotation ceased. The position of the head is, therefore, determined by a single stop means and is not dependent upon a plurality of latches or wedge members for first stopping it and then locking it in such position. In the device herein disclosed the members are brought into direct engagement with each other, that is the forces act normally to the co-acting surfaces and the construction is not, therefore, subject to the defects and inaccuracies due to wear upon wedge members and other frictionally engaging surfaces.

The above novel features are herein combined with and incorporated in a novel manner with a fluid actuating means comprising a piston means including a plurality of pistons in which one piston acts continuously upon the driven member and rotation is obtained by the intermittent application of fluid pressure to the other piston which serves to overcome the force of the first and results in rotation of the head. This invention includes a simplified arrangement of such fluid actuating piston means wherein the pistons and their respective racks are arranged on opposite sides of the index spindle resulting in a well balanced construction and reducing to a large extent bending forces acting upon the spindle.

Other objects of the invention include a very much simplified and convenient construction of the supporting housing whereby the parts are readily assembled or removed through an opening in the housing, which opening is provided with a plate adapted to support the rotary spindle.

The objects of this invention also contemplate the provision of simplified yet reliable and positive control features for both the stop means and for the valve controls for the fluid actuating pistons.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
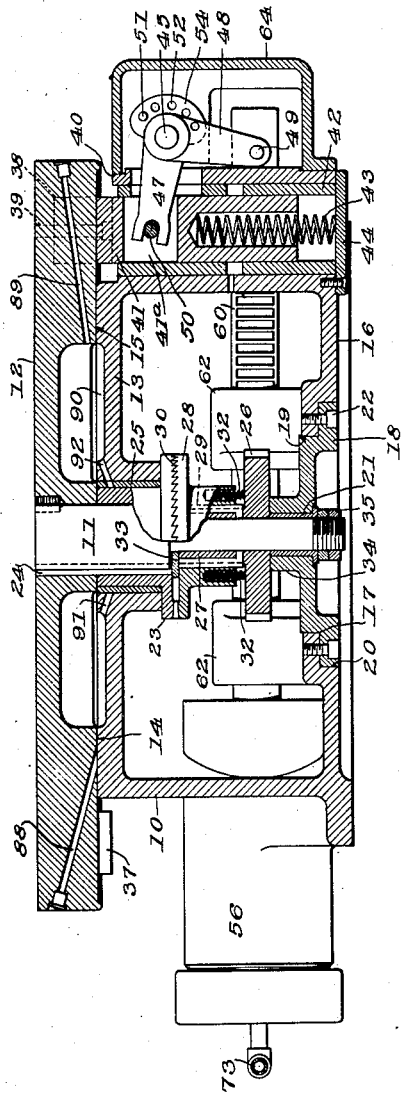
Figure 3:
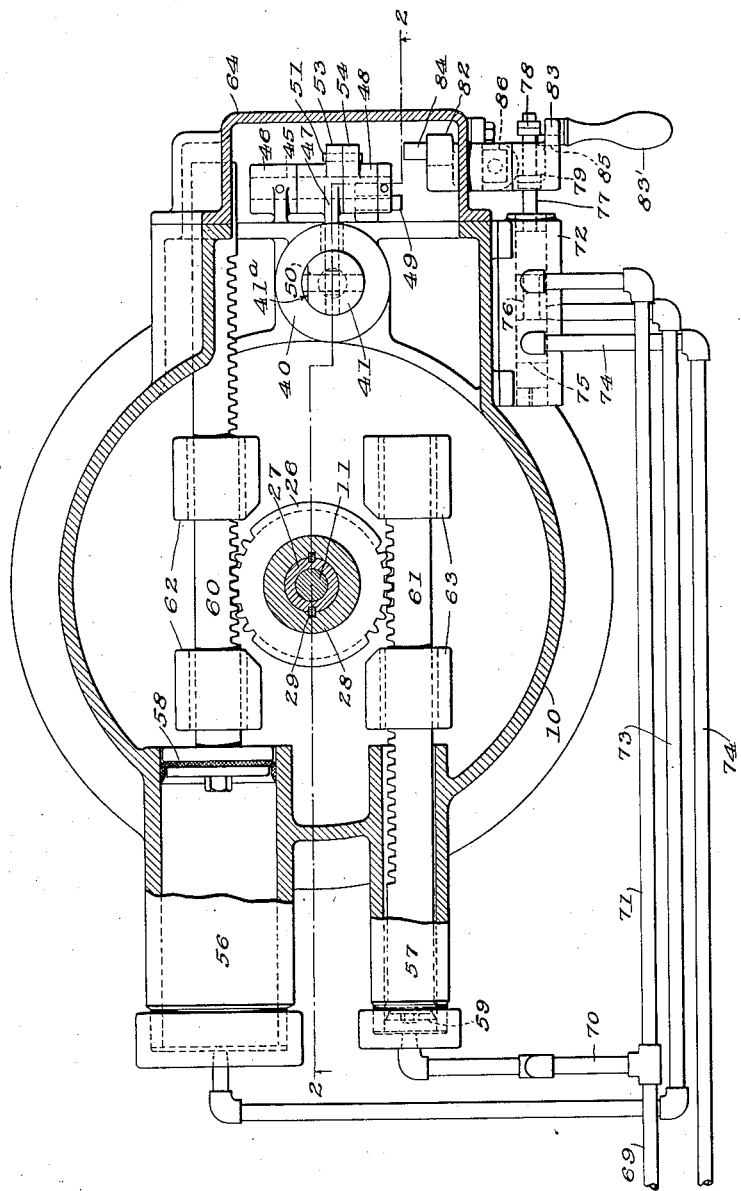
Figure 4:
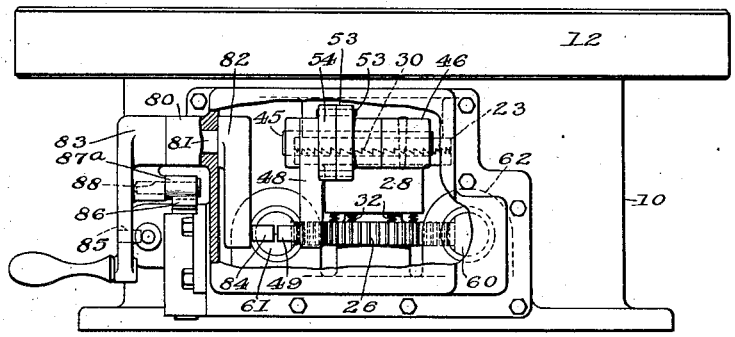
Figure 5:
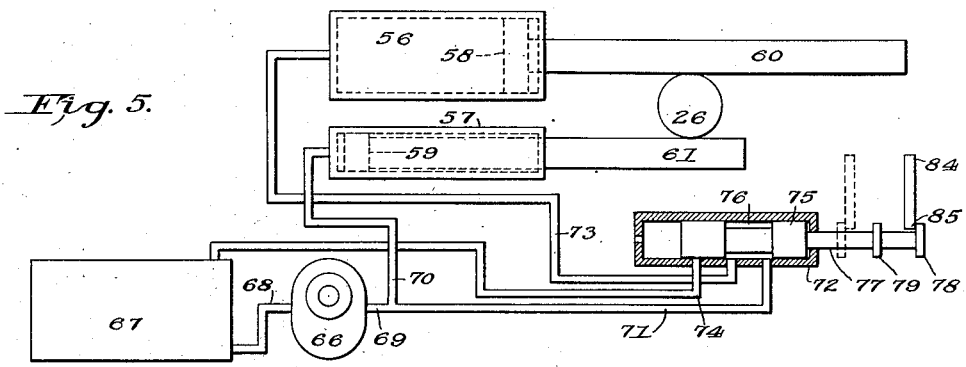
Figure 6:
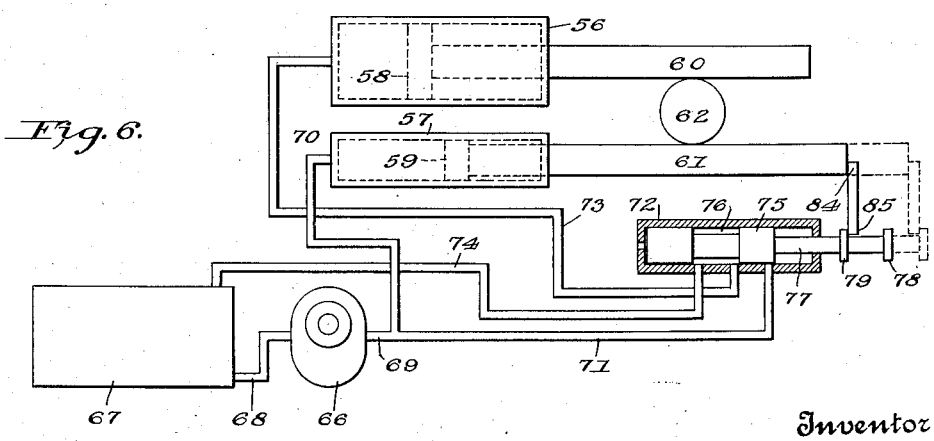
Figure 7:
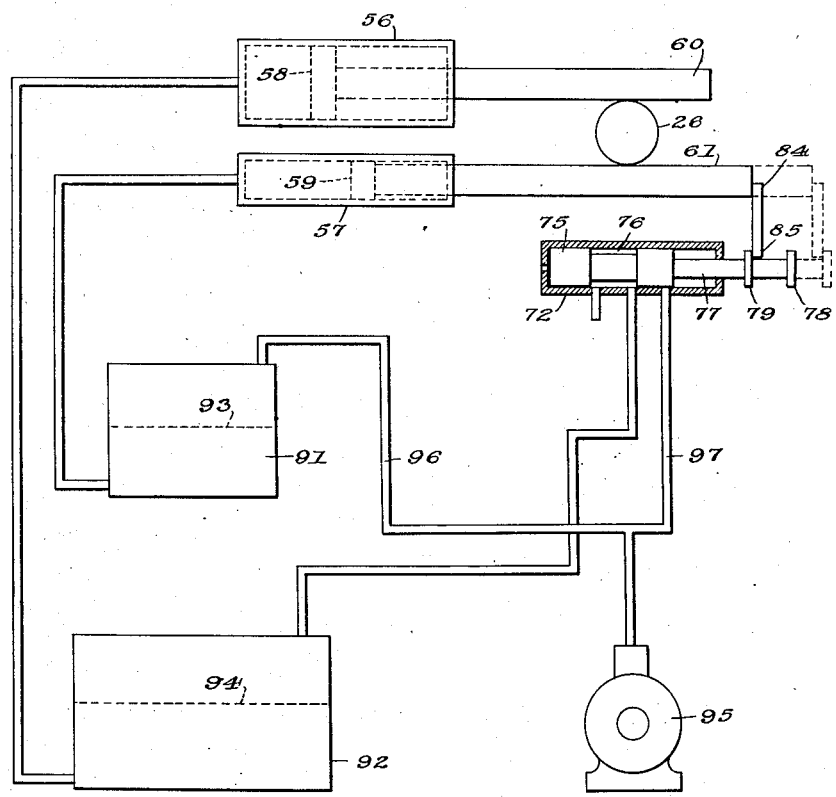

Figure 1 is a side elevational view of the indexing mechanism. Fig. 2 is a vertical cross sectional view thereof, taken on the line 2—2 of Fig. 3. Fig. 3 is a horizontal sectional view of the mechanism with parts broken away to show certain control actuating means. Fig. 4 is an end elevational view partly broken away in order to show certain exterior elements of the mechanism and their relation to each other. Fig. 5 is a diagrammatic view of the fluid pressure means showing the fluid being admitted to the larger piston. Fig. 6 is a view similar to Fig. 5 but showing the control valve in the exhaust position and Fig. 7 is a diagrammatic view showing a modified form of fluid actuating means.

In the drawings the invention is shown as a fluid actuating indexing mechanism capable of being incorporated in various well known machine-tools, and consists in general of a main cylindrically shaped housing 10 having centrally mounted therein a rotary spindle or main shaft 11, upon which is rigidly mounted the index head or table 12. The table 12 is one of the ordinary type and is adapted to support various tools or the parts to be operated upon and accordingly may be provided with any desired means for fastening thereto the various chucks or tool holders common to such equipment.

As shown herein the device is indicated as being adapted to vertical machines, but it is to be understood that the indexing mechanism is capable of being applied equally well to horizontal machines in any well adapted manner. The upper part of the housing is provided with a web supporting member 13, which has the flat bearing surface 14 adapted to support and form a bearing for the adjacent surface 15 on the index table. The housing also has the lower web member 16 having an opening 17 therein adapted to receive a cover 18 therein. The cover or plate 18 is provided with two cylindrical portions 19 and 20 adapted to fit into the corresponding openings of the web 16 whereby such plate is rigidly and accurately located and may be utilized to support a bearing 21 for the rotary spindle 11. Suitable set screws 22 are provided permitting the ready removal of the plate.

The upper end of the main shaft 11 has rigidly mounted thereon the driven clutch member 23, said clutch member being keyed to the shaft by any suitable means, such as the key 24, which key also co-acts with the rotary head 12 to non-rotatably secure the head on the shaft. The hub of the clutch member is surrounded by a bearing sleeve 25, the whole forming a very substantial bearing capable of withstanding the strains liable to be applied to the indexing head.

Mounted below the driven clutch member is an oscillatory gear member 26, having a hub 27 projecting therefrom upon which is slidingly mounted the driving clutch member 28. Teat keys 29 are provided to enable the driving clutch member 27 to be slidably but non-rotatably mounted on the gear-hub. The clutch members 23 and 28 are provided with co-acting saw teeth 30, thus resulting in a one-way clutch or ratchet driving mechanism whereby oscillations of the driving member 26 produce a step-by-step rotary motion of the index table. The clutch member 28 is normally maintained in engagement with the upper driven clutch member 23 by means of the compression springs 32. A suitable spacer or washer 33 is provided between the adjacent faces of the clutch members.

A projecting hub portion 34 of the cover plate 18 carries the bushing 21 and serves as a thrust member to support the oscillatory driving member 26. Suitable lock washers and nuts 35 are provided at the lower end of the main shaft spindle.

The above described construction constitutes one of the novel features of this invention and as may be seen provides a very compact construction and one in which the operating parts may be readily assembled through the opening 17; the cover-plate 18 therefore forming a convenient means for obtaining ready access to the unit and at the same time providing a very rigid supporting element.

The index table is provided with a plurality of stop members 37 thereon, which may be of any desired shape or mounted thereon in any desired manner, but in any event must be very well secured and the construction herein disclosed is very well adapted to accomplish such functions; such constructions consisting of the stop members 37 being adapted to fit in cylindrically shaped openings 38 in the lower side of the index table and held therein by counter-sunk screw bolts 39. Securely mounted in a cylindrical portion 40 of the main housing is the vertical plunger or adjustable stop member 41 having the bearing sleeve 42 adapted to freely reciprocate therein but being normally urged to its upward or outward position by the compression spring 43 supported at its lower end by the removable plate 44. The stop members 37 and plunger 41 have the flattened surfaces 37ª and 41ª respectively adapted to contact when the table is in an indexed position.

Mechanical means for withdrawing the plunger at the proper time in the normal operation of the machine consists of a shaft 45 mounted in the supporting member bracket 46 rigidly supported on the main housing. Two arms 47 and 48 are adjustably secured to each other and mounted on the shaft 45 in a manner to form a bell crank; the arm 48 having thereon a projecting pin 49 adapted to be engaged by one of the fluid pressure operating racks in the normal operation thereof. The other arm 47 projects into a slotted opening 41ª in the plunger 41 having a pin and slot connection 50 therewith in the manner shown. The positions of the two arms relative to each other is adjustable by means of the pin 51 adapted to be inserted through any two co-acting holes 52 in the flanged portions 53 and 54 of the respective arms 47 and 48.

The fluid actuating mechanism will now be described and consists of a large cylinder 56 and a smaller cylinder 57 having the pistons 58 and 59 respectively. As shown the fluid cylinders may be integral with the main housing and ranged on opposite sides of the axis thereof, thereby providing a very simple and rigid construction easily manufactured in a single casting. Each of the pistons is provided with a rack member 60 and 61 respectively adapted to be continuously in engagement with the oscillatory driving member 26. Suitable guides 62 for the rack 60 are provided and likewise guides 63 for the rack 61.

The arrangement of the cylinders in a substantially parallel manner, and on opposite sides of the rotary main shaft results in a very much condensed, compact and rigid construction, and one which permits of a very convenient location of various elements as, for example, the end of the rack 61 is adapted to engage with the various controlling devices located in the auxiliary housing 64 adjacent the main housing and the control members therein are thereby actuated without any additional attachments being required for bringing the reciprocating parts into operative relation with the control elements.

The fluid supply means comprises a hydraulic pump 66 adapted to be operated from a convenient part of the machine or by any external power means and draws the hydraulic fluid from the sump 67 through the pipe 68 and delivers it to the pipe 69 which has a connection 70 directly to the smaller cylinder 57 whereby the fluid is caused to act continuously on the piston therein. A second branch 71 leads to the valve casing 72 and is selectively conducted therefrom through the pipe 73 to the larger cylinder 56. An exhaust pipe 74 leads from the valve casing to the sump.

Any suitable valve means may be provided, such as herein disclosed, the double piston type valve 75 having the annular passage 76 permitting the pipe 73 to be selectively connected to either the pump or the sump. The actuating means for the valve constitute a stem 77 projecting longitudinally therefrom having the collars 78 and 79 spacedly fixed thereto. Mounted in the boss 80 is an oscillatory shaft 81 having rigidly attached thereto the arms 82 and 83. The arm 82 has fixed thereto a pin 84 arranged in the path and adapted to be engaged by the rack 61 in its outward movement. The arm 83 has a like projecting pin 85 adapted to fit between the collars 78—79 on the valve stem 77. A carry-over device is adapted to co-act with the arm 83 and consists of a wedge shaped member 86 normally urged upward by the spring 87 and both being mounted on a portion of the housing. The wedge member 86 co-acts with a roller 87ª mounted on the arm by means of the stud 88; the device thus comprising an impositive means for urging the arm 83 and likewise the connected valve to either of its extreme positions and for releasably maintaining them in such position. Thus, the full operation of the valve is assured in each case and the danger of it stopping at a mid-portion whereby the full opening of the passages is not accomplished resulting in the stopping of the machine or a sluggish operation thereof is practically eliminated.

Reliable and convenient lubricating means are provided, including the passages 88 for supplying oil to the co-acting surfaces 14 and 15 and a passage 89 for supplying oil to the basin 90, which in turn supplies oil to the bearing through the passages 91 and 92; the oil being adapted to flow downwardly through this bearing into the inner housing.

The operation is substantially as follows, and referring particularly to Figs. 5 and 6, what may be termed the normal position, is shown in Fig. 5 thereof, that is, the hydraulic pump is supplying a liquid to both pistons whereby the head has been rotated so that one of the stops 37 has engaged the plunger 41 and is rigidly maintained in that position by the preponderance of pressure on the larger piston 58. When the operation in this position has been completed the valve 75 is moved to the left by means of the arm 83. The arm herein is shown as being manually operated by means of the handle 83′ (Figs. 1 and 3) but it is to be understood that this may be operated automatically from any suitable part of the machine in the proper sequence with the cycles to be performed. Upon movement of the arm 83 to the left the roller 87ª passes the mid-point of the wedge member 86 and the further movement of the arm is assured and carried out by the means of the aforesaid carryover mechanism operating through the wedge member 86 upon roller 87ª. The valve now assumes the position shown in Fig. 6 whereby the fluid is exhausted from the large cylinder 56 and this permits the small piston to rotate the driving member 26 in the opposite direction, which is the non-engaging direction for the one-way clutch. Near the end of its stroke the rack member 61 engages the pin 49 and also the pin 84. Engagement of the pin 49 withdraws the stop plunger and engagement of the pin 84 causes the valve to assume the position shown in Fig. 5 whereupon the table is caused to rotate by the preponderance of pressure upon the piston 58 until next succeeding stop member 37 has been brought into engagement with the retractable plunger 41. This position is rigidly and accurately maintained until the next operation of the valve through the handle 83'.

It may be seen from the above outlined operation and construction that the index head is moved to the desired location and held at such position with a minimum of machine elements and that the position of the head is dependent upon the contact of two surfaces moving directly into engagement with each other without any sliding contact for creating wear on the elements and without the necessity of providing additional locking members. This constitutes one of the most important features of this invention, together with the very much simplified means of operating and controlling the fluid actuated means and the stop mechanism.

As described herein the motivating fluid is an hydraulic fluid such as oil which has certain qualities, such as incompressibility, making it desirable and well adapted to the positive operation of the mechanism herein disclosed. It is to be understood, however, that other types of pressure fluid may be employed dependent upon the conditions and availability of such fluids and the conditions under which the machine is required to operate; as for example, the pressure fluid may constitute compressed air obtained from a pressure line, such as is ordinarily found throughout manufacturing plants.

A further and very desirable form of fluid means well adapted to certain types of work is illustrated in Fig. 7 hereof and constitutes a combination of hydraulic and elastic fluid means wherein a reservoir 91 is provided in the fluid line to the smaller cylinder and a reservoir 92 in the fluid line to the larger cylinder. Each of these reservoirs are partially filled with a hydraulic fluid, as for example, to the levels 93 and 94 respectively therein whereby the hydraulic fluid is constantly in contact with the respective pistons and an elastic fluid is supplied to the upper parts of said tank from the pump 95 having a branch 96 leading directly to the reservoir 93 and a branch 97 adapted to be intermittently connected with the reservoir 92, or again the pump 92 may be replaced by a connection to the ordinary pressure line found in manufacturing plants.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:

1. Actuating means for indexing mechanisms combining a rotary member; a gear connected thereto; a rack in engagement therewith; fluid pressure means adapted to act constantly on said rack tending to rotate said member in one direction; a second rack connected to said gear at a point angularly displaced from said first named rack; and fluid pressure operating means therefor for intermittingly rotating said gear in the opposite direction against the force of said first named fluid pressure means.

2. An indexing mechanism for machine tools combining a rotary index head; stop means therefor; an oscillatory member mounted concentrically with said head; one way clutch means connecting said member to said head; a hydraulic cylinder; connections therefrom to said member for rotating the latter in one direction; a second hydraulic cylinder; connections therefrom to said member for rotating the latter in the opposite direction whereby the clutch means operates to rotate said head into engagement with said stop means and to hold it there against during the working operation.

3. In a machine tool, a rotary member; and means for imparting an indexing movement thereto comprising a rack gear, ratchet mechanism connecting said gear to said rotary member, stop means for said member, a rack engaging said gear, fluid pressure means adapted to act constantly on said gear and tending to rotate it in one direction, a second rack engaging said gear, and fluid pressure operating means therefor for rotating said gear in the opposite direction against the force of said first named fluid pressure means and for holding said rotary member in engagement with said stop.

4. An indexing mechanism for machine tools combining a rotary mainshaft; an index head mounted to rotate therewith; stop means therefor; a driving gear mounted for oscillatory movement on said shaft; a one way clutch connecting said driving gear to said shaft; a cylinder; a piston mounted therein; a rack connecting said piston to said gear; means permitting a hydraulic fluid to act constantly on said piston tending to rotate said gear in one direction; a second cylinder; a piston therein; a second rack connecting said second piston to said gear; and means for intermittently admitting hydraulic fluid to said second cylinder whereby said driving member is caused to rotate against the force of said first named piston and said clutch operates to rotate said head into engagement with said stop means and to hold it thereagainst.

5. A machine tool indexing mechanism combining, a rotary head; a releasable stop member adapted to engage and position said head in predetermined positions; a rotary actuating member; a one way clutch means connecting said rotary member to said head; a first fluid pressure means connected to rotate said rotary member in the clutch engaging direction to cause said head to engage said stop member and to hold it in such engaged position; and a second fluid pressure means for returning said first named fluid pressure means and rotary member.

6. A machine tool combining, a rotary head; a gear; ratchet mechanism connecting said gear to said head; a releasable stop adapted to engage said head to hold it in predetermined positions; a first hydraulically operated piston; rack means connecting said piston to said gear, said piston in its movement in one direction being adapted to rotate said head into engagement with said stop member and to hold it in such position; a second hydraulically operated piston; a second rack connecting said second piston to said gear for returning said first named piston.

7. An indexing mechanism combining, a housing; a mainshaft centrally mounted therein; an index head mounted thereon exteriorly of said housing; a pair of fluid pressure cylinders integral with said housing and having their axes extending on opposite sides of said mainshaft in a plane substantially perpendicular thereto; and means operatively connecting each of said pistons to said shaft for imparting an indexing motion thereto.

8. An indexing mechanism combining, a main housing; a mainshaft rotatably mounted longitudinally of said housing; a pair of cylinders arranged on opposite sides of said shaft and having their axes extending in a plane substantially perpendicular to said shaft; fluid pressure operated racks extending from each of said cylinders adjacent said shaft; means on said shaft adapted to be engaged by said racks for imparting an indexing movement thereto; an auxiliary housing extending laterally from said main housing; control means mounted therein and adapted to be engaged by said rack means for operation thereof.

9. An indexing mechanism combining a rotary table; a series of stops thereon; a releasable plunger adapted to engage said stops; means for normally urging said plunger into engagement with said stops; fluid actuating means for rotating said table and for holding it in engagement with said plunger; a bell crank attached to said plunger; a reciprocable member attached to said fluid actuating means and means on said bell crank adapted to be engaged by said reciprocable member for releasing said stop member from engagement with said table.

10. Fluid actuating means for indexing mechanism combining an oscillatory driving gear; a pair of cylinders; pistons therein; racks connecting each of said pistons with said gear; and fluid control means for said cylinders comprising a valve adapted to occupy exhaust and inlet positions, a stem projecting therefrom, a rotatively mounted shaft, an arm thereon having a loose connection with said valve stem, means for moving said arm in one direction, a second arm rigidly mounted on said shaft adapted to be engaged by one of said racks for moving the first named arm in the opposite direction, and impositive means for releasably causing said valve to assume either one of said positions.

11. A machine tool indexing mechanism combining a rotary mainshaft; fluid actuating mechanism for imparting an indexing movement thereto; and control means therefor comprising a valve adapted to be moved into inlet and outlet positions, a stem projecting therefrom, an oscillatory shaft, an arm rigidly mounted thereon having a lost motion connection with said valve stem, means for moving said arm in one direction, a second arm rigidly mounted on said oscillatory shaft and adapted to be engaged by said fluid actuating mechanism for moving said first named arm in the opposite direction, and impositive means for releasably causing said arm and valve to assume either of said positions.

12. An indexing mechanism for machine tools combining a rotary spindle; an index head carried thereby; fluid actuating means therefor; and control means for said fluid means comprising a valve movable into inlet and exhaust positions, a stem projecting from said valve, a shaft mounted for oscillatory movement, an arm mounted thereon having a connection with said valve stem, a second arm mounted on said shaft and adapted to be engaged by said fluid actuating means to move the valve into one position, and other means for rotating said shaft to move the valve into the other position.

13. An indexing mechanism combining, a rotatively mounted mainshaft; fluid actuated mechanism for imparting a step-by-step movement thereto; and control means therefor comprising a valve movable into exhaust and inlet positions, a valve stem therefor, an oscillatory shaft, a connection therefrom to said valve stem means for rotating said arm to move said valve into one position, and an arm mounted on said oscillatory shaft adapted to be engaged by said fluid actuated mechanism for moving said valve into the other position.

14. An indexing mechanism for machine tools combining, a rotary shaft; a gear rotatably mounted thereon; clutch means connecting said gear to said shaft; and fluid means for oscillating said gear to impart an indexing movement to said shaft comprising, a pair of cylinders, pistons therein, a rack for each of said pistons operatively engaging said gear, a control means for moving said valve into one position and means engaged by one of said racks for moving said valve into a second position.

15. A fluid actuating means for indexing mechanisms combining a rotary mainshaft; a driving gear; clutch mechanism connecting said gear to said shaft; a pair of fluid actuated pistons; operating connections between each of said pistons and said gear for oscillating the latter; a control valve movable into exhaust and inlet positions; means for moving said valve to one position; and other means engaged by one of said operating connections for moving said valve to the other position.

16. A machine tool combining, a housing; a rotary mainshaft mounted therein; a head mounted exteriorly of said housing on one end of said shaft to rotate therewith; a gear rotatably mounted on said shaft within said housing; one way clutch mechanism connecting said gear to said head; means for oscillating said gear to impart an indexing movement to said head; and a member detachably mounted on said housing adapted to support the opposite end of said shaft and to permit the assembly of the operating parts in said housing.

17. In a machine tool, a housing having a bearing supported at one side thereof; a mainshaft rotatably mounted in said bearing and extending through said housing; a rotary head mounted on said shaft exteriorly of said housing; a driving member rotatably mounted on said shaft within said housing; a one way clutch mechanism connecting said member to said shaft; means for oscillating said member to impart an indexing movement to said head; a supporting web member having an opening therein and forming part of said housing at the side thereof opposite to said bearing; a plate detachably mounted in said opening and a bearing for said shaft in said plate.

18. An indexing mechanism for machine tools combining, a housing having a supporting web member at one side thereof; a rotary spindle extending through said housing; a bearing for said spindle in said web member; an index head mounted on said spindle exteriorly of said housing; a driving element rotatively mounted on said spindle within said housing; one way clutch means between said driving element and said spindle comprising a driven clutch member rigidly mounted on said spindle, a driving clutch member splined to said driving element and means for normally urging said driving clutch member into engagement with said driven clutch member; a second web member arranged at the opposite side of said housing having an opening therethrough; a plate removably mounted in said opening; and a bearing in said plate for said spindle said plate being also adapted to support said driving element against axial movement on said shaft.

19. An indexing mechanism for machine tools combining a housing; a rotary mainshaft mounted therein; supporting web members at opposite longitudinal sides of said housing; a driving element rotatively mounted on said shaft; means for oscillating said driving element; a driven clutch member rigidly mounted on said shaft and having a bearing sleeve extending into one of said web members; an index head mounted adjacent thereto exteriorly of said housing; a driving clutch member arranged between said driving element and said driven clutch member; a plate mounted in an opening of the other of said web members; and a bearing therein for said shaft.

20. A machine tool combining a housing; an indexing shaft rotatably mounted therein; a rotary member operatively connected to said shaft; and means for operating said rotary member, comprising a pair of cylinders carried by said housing, pistons therein, said cylinders being angularly displaced relative to each other about said rotary member, and connections from each of said pistons to said rotary member.

In witness whereof, I have hereunto subscribed my name.

ALFRED G. SUDHOFF.